(12) United States Patent
He

(10) Patent No.: US 10,574,978 B1
(45) Date of Patent: Feb. 25, 2020

(54) SYSTEM AND METHOD FOR DIAGNOSING QOE IN REAL TIME COMMUNICATION

(71) Applicant: Agora Lab, Inc., Santa Clara, CA (US)

(72) Inventor: Feng He, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 0 days.

(21) Appl. No.: 16/546,689

(22) Filed: Aug. 21, 2019

(51) Int. Cl.
*H04N 7/15* (2006.01)
*H04N 17/00* (2006.01)

(52) U.S. Cl.
CPC ............... *H04N 17/00* (2013.01); *H04N 7/15* (2013.01)

(58) Field of Classification Search
CPC .......... H04N 7/15; H04N 17/00; H04L 43/00; H04L 43/04; H04L 43/0829
USPC ........... 348/14.01–14.16; 370/260–261, 235; 715/753
See application file for complete search history.

(56) References Cited

U.S. PATENT DOCUMENTS

| 7,385,622 B2* | 6/2008 | Babka | H04N 7/152 348/14.08 |
| 2003/0202008 A1* | 10/2003 | McDonald | H04L 29/06 715/736 |
| 2018/0278928 A1* | 9/2018 | De La Paz | H04N 17/004 |

* cited by examiner

*Primary Examiner* — Melur Ramakrishnaiah
(74) *Attorney, Agent, or Firm* — The Law Offices of Konrad Sherinian

(57) ABSTRACT

A real-time communication monitoring and diagnosing system is provided on a real-time communication monitoring and diagnosing computer system. The monitoring and diagnosing system includes time line, a video downstream bitrate axis extending upward from reference line, an audio downstream bitrate axis extending downward from the reference line, a video downstream bitrate curve in a first color above the reference line, an audio downstream bitrate curve in a second color below the reference line, a set of choppy video marks in a third color above and along the reference line, a set of blurry video marks in a fourth color as a dotted line along the video downstream bitrate curve, and a set of audio marks in a fifth color below and along the reference line.

12 Claims, 16 Drawing Sheets

FIG. 14

FIG. 15

SYSTEM AND METHOD FOR DIAGNOSING QOE IN REAL TIME COMMUNICATION

CROSS REFERENCE TO RELATED APPLICATIONS

NONE.

FIELD OF THE DISCLOSURE

The present invention generally relates to real-time communication over a wide area network, and more particularly relates to diagnosing quality of experience of participants in a real-time communication session. More particularly still, the present disclosure relates to a new monitoring and diagnostic system illustrating multiple user's experience of other users of a real-time communication session in an integrated system.

DESCRIPTION OF BACKGROUND

Internet based communication is becoming more prevalent. It provides numerous advantages over conventional methods of communication. For instance, Internet based communication is real-time, incurs lower costs, is more convenient, has a wide reach, is scalable and provides many other benefits for group communication. Internet based communication can include audio, video, or both.

However, real-time communication over the Internet also presents various issues, such as interruption in audio and/or video transmission, loss of transmission packets containing audio and/or video data, latency in audio/video transmission, jitter, and other issues. These issues result in loss of voice segments, loss of video frames, decreased audio quality, decreased video quality, and other types of poor user experience. These issues can be caused by the network connection between multiple parties of a real-time communication session. The network connection may be of low bandwidth or reliability.

Users' experience in real-time communication over the Internet is oftentimes evaluated by Quality of Experience (QoE). QoE can be described and measured by a number of parameters, such as video resolution, choppy video time, video sharpness (also known as video clarity) and choppy audio time. Accordingly, QoE can be affected by the quality of network connection between the participants of a particular real-time communication session. Poor network connection quality causes data packet loss or late arrival of data packets that result into choppy video and/or choppy audio (collectively referred to herein as choppy multimedia). Such late data packets are usually discarded in real-time communication, such as a conference meeting between a group of users. Data packets are blocks of data transmitted over the Internet. For instance, the data packets can be User Datagram Protocol (UDP) data packets. UDP is also a transport-layer networking protocol.

The capabilities of a user's terminal device (such as a desktop computer, a laptop computer, a tablet computer, or a smartphone) can also affect the user's experience. For example, choppy video and/or choppy audio may occur if the processing unit (such as CPUs) of the terminal device is not capable of quickly decoding received video and/or audio data. Monitoring and quickly identifying the QoE issues are thus vital in correcting and improving QoE in any real-time communication.

Traditionally, a monitoring system displays each monitored QoE parameter of each participant's terminal. These parameters are displayed one by one. A prior art partial QoE monitoring user interface is shown in FIG. 1 and generally indicated at 100. The QoE data shown at 100 indicates a first user's experience of listening to the audio and viewing the video of a second user. As user herein, it is said to be the first user's experience of the second user.

The plain sequential listing style of FIG. 1 presents numerous undesirable effects. It tries to list a big number of QoE parameters and is thus not intuitive. It also occupies excessive amount of display space. Accordingly, it is difficult to clearly and quickly identify each user's experience. For instance, user A's experience of listening to and/or viewing user B may be good while user A's experience of listening to and/or viewing user C involves choppy audio and/or video. Such a situation is hard to be identified in the sequential listing all users' QoE data. As used herein, a first user's (such as user A) experience of listening to and/or viewing a second user (such as user B) is termed as the first user's experience of the second user.

Accordingly, there is a need for a new QoE monitoring system for effectively identifying various QoE issues within a small display space. The new QoE monitoring system presents information of numerous QoE parameters of each user's experience of every other user in a single diagram. The new QoE monitoring system further allows a professional to quickly identify any user' QoE issues of the user's experience of any other user within a multi-user real-time communication session.

SUMMARY OF THE DISCLOSURE

Generally speaking, pursuant to the various embodiments, the present disclosure provides a real-time communication monitoring and diagnosing computer system. The real-time communication monitoring and diagnosing computer system includes a processing unit, some amount of memory operatively coupled to the processing unit, a networking interface operatively coupled to the processing unit for accessing the Internet, a video interface operatively coupled to the processing unit for displaying representation of real-time communication diagnostic data, an operating system adapted to run on the processing unit, and a special real-time communication diagnostic software application adapted to run on the operating system and communicate with a special real-time communication server software application over the Internet. The special real-time communication diagnostic software application is adapted to display a real-time communication monitoring and diagnosing system on the video interface. The real-time communication monitoring and diagnosing system includes a time line indicate time of a real-time communication session, a video downstream bitrate axis extending upward from a reference line, an audio downstream bitrate axis extending downward from the reference line, a video downstream bitrate curve in a first color above the reference line, an audio downstream bitrate curve below the reference line in a second color, and a set of choppy video indicators in a third color extending upward from and along the reference line.

The real-time communication monitoring and diagnosing system further includes a set of blurry video indicators in a fourth color along the video downstream bitrate curve. The fourth color is different from the first color. Each blurry video indicator within the set of blurry video indicators is rendered as a dotted line. In one implementation, the third color and the fourth color are red. The real-time communication monitoring and diagnosing system further includes a set of choppy audio indicators in a fourth color extending downward from and along the reference line. The real-time communication monitoring and diagnosing system further includes a set of blurry video indicators in a fifth color along the video downstream bitrate curve. The fifth color is different from the first color and is red in one implementation.

Further in accordance with the present teachings is real-time communication monitoring and diagnosing computer system including a processing unit, some amount of memory operatively coupled to the processing unit, a networking interface operatively coupled to the processing unit for accessing the Internet, a video interface operatively coupled to the processing unit for displaying representation of real-time communication diagnostic data, an operating system adapted to run on the processing unit, and a special real-time communication diagnostic software application adapted to run on the operating system and communicate with a special real-time communication server software application over the Internet. The special real-time communication diagnostic software application adapted to display a left real-time communication monitoring and diagnosing system and a right real-time communication monitoring and diagnosing system on the video interface. The left monitoring and diagnosing system and the right monitoring and diagnosing system are displayed side-by-side.

The left monitoring and diagnosing system includes a first time line indicating time of a real-time communication session, a first video downstream bitrate axis extending upward from a first reference line, a first audio downstream bitrate axis extending downward from the first reference line, and a first video downstream bitrate curve in a first color above the first reference line. The first video downstream bitrate curve indicating bitrates of video data received by a first terminal device from a second terminal device. The left monitoring and diagnosing system also includes a first audio downstream bitrate curve below the first reference line. The first audio downstream bitrate curve indicates bitrates of audio data received by the first terminal device from the second terminal device. The left monitoring and diagnosing system further includes a first set of choppy video indicators in a second color extending upward from and along the first reference line.

The right monitoring and diagnosing system includes a second time line indicating time of the real-time communication session, and a second video downstream bitrate axis extending upward from a second reference line. The second video downstream bitrate curve indicates bitrates of video data received by the second terminal device from the first terminal device. The right monitoring and diagnosing system also includes a second audio downstream bitrate axis extending downward from the second reference line, and a second video downstream bitrate curve in a third color above the second reference line, a second audio downstream bitrate curve below the second reference line. The second audio downstream bitrate curve indicates bitrates of audio data received by the second terminal device from the first terminal device. The right monitoring and diagnosing system further includes a second set of choppy video indicators in a second color extending upward from and along the second reference line. The second color is red and different from the first color and the third color. The left monitoring and diagnosing system further includes a first set of choppy audio indicators in a fourth color extending downward from and along the first reference line, and the right monitoring and diagnosing system further includes a second set of choppy audio indicators in a fourth color extending downward from and along the second reference line. In one implementation, the second color is red.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 14 is a block diagram illustrating a real-time communication session block in accordance with this disclosure.

FIG. 15 is a block diagram illustrating a monitoring and diagnostic system showing multiple participants' experience in a real-time communication session in accordance with this disclosure.

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
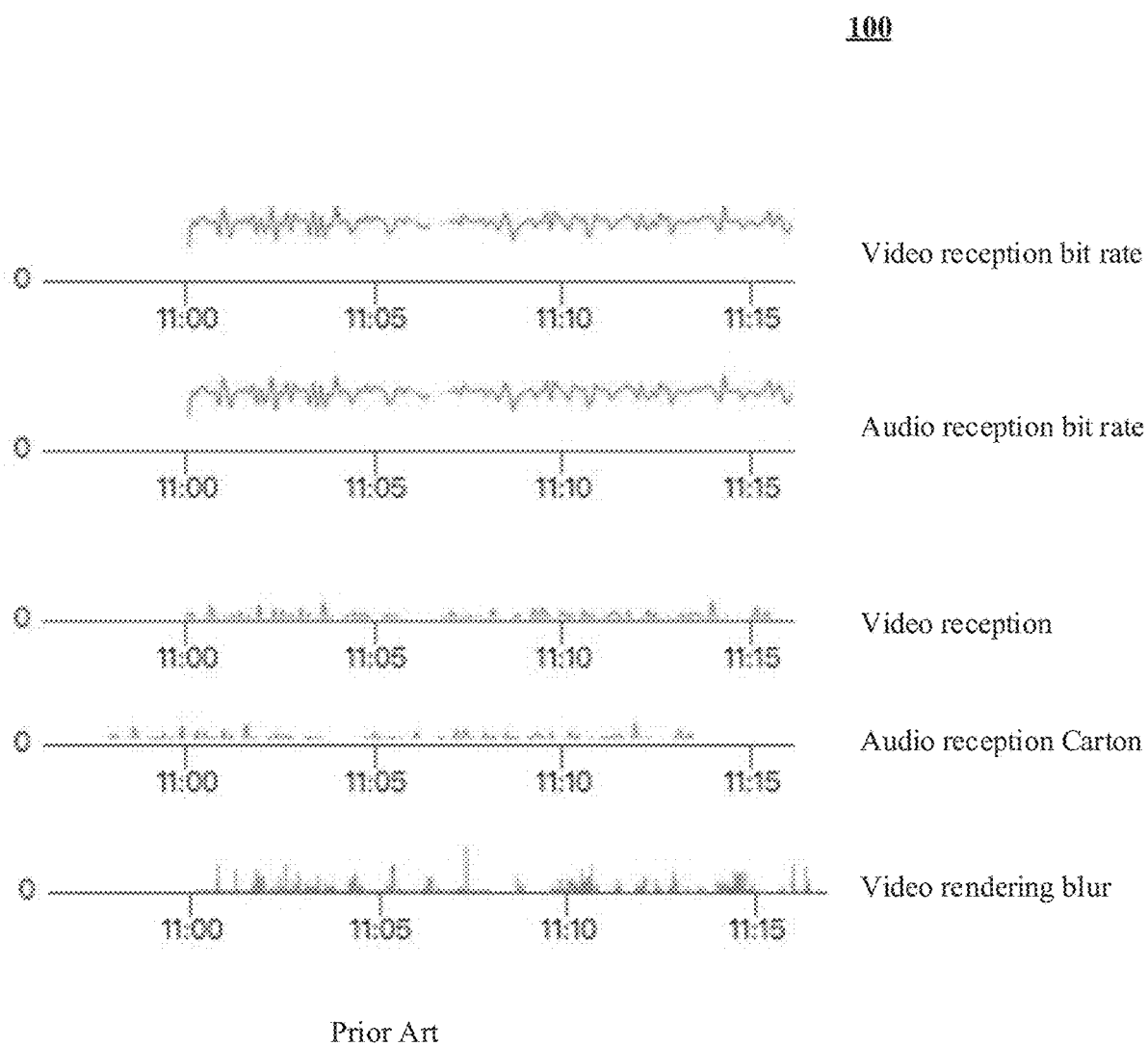
FIG. 1 is a prior art communication monitoring user interface.
Figure 2:
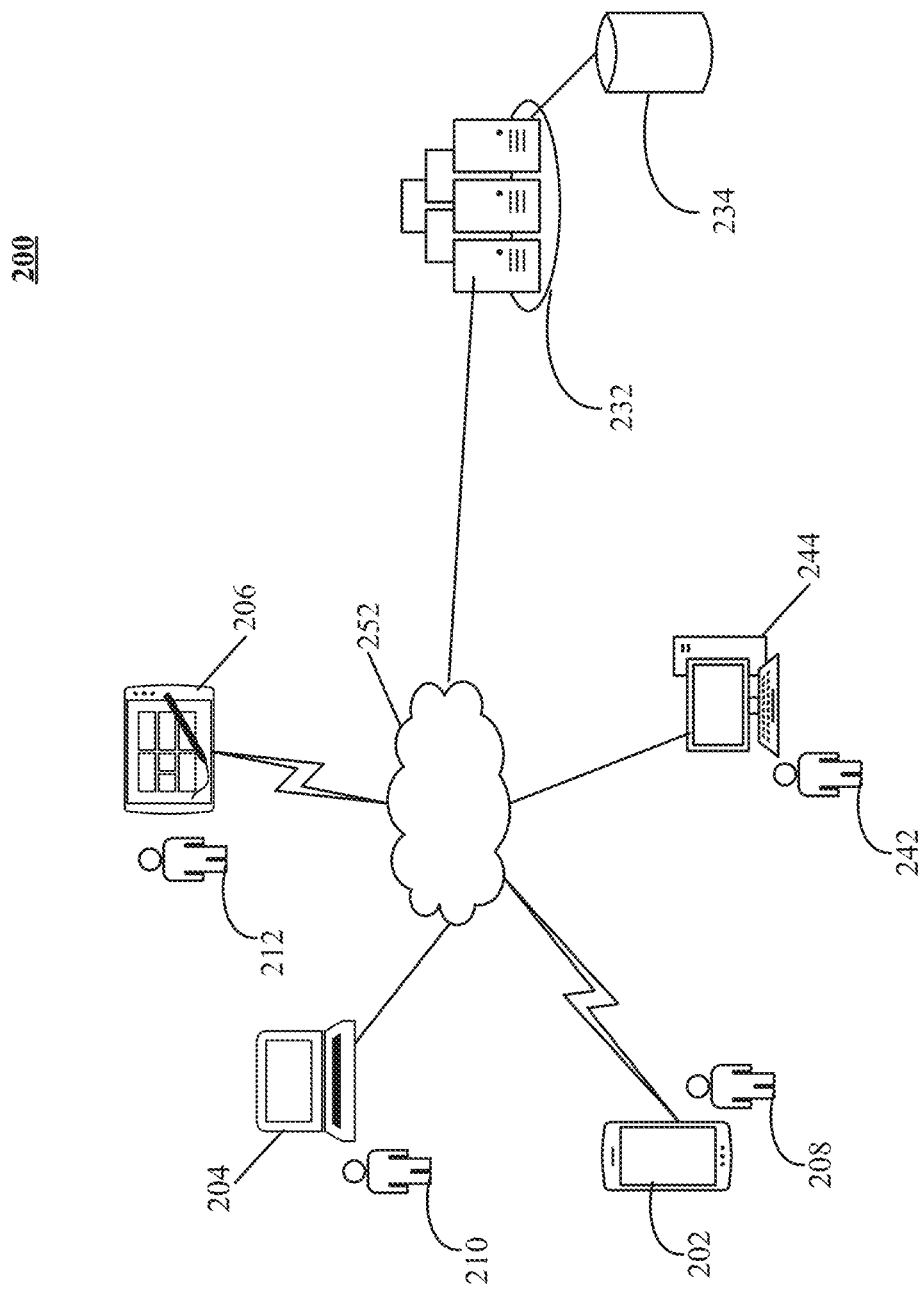
FIG. 2 is an illustrative block diagram of a real-time communication system in accordance with the teachings of this disclosure.

Turning to the Figures and to FIG. 2 in particular, a block diagram of a real-time communication system is shown and generally indicated at 200. The illustrative environment regulation system 200 includes a set (meaning one or more) of participant terminal devices 202, 204 and 206 adapted to be operated by the respective participants (also referred to herein as users) 208, 210 and 212. The users 208-212 participate in a real-time communication session, such as an audio conference call or a video conference. It should be noted that there can be any number of participants in a real-time communication session. During the session, some users may join later than others and certain user may exit earlier than others. In addition, some user may choose to participate via audio only while other participate via both audio and video.

Each of the terminal devices 202-206 includes a processing unit (such as CPU), some amount of memory operatively coupled to and accessed by the processing unit, a networking interface operatively coupled to and accessed by the processing unit, an audio interface operatively coupled to and accessed by the processing unit, a video interface operatively coupled to and accessed by the processing unit, and a microphone operatively coupled to and accessed by the processing unit. In addition, each of the terminal devices 202-206 includes an operating system (such as Apple OS, Windows, Linux, etc.) and a special real-time communication terminal software application for the real-time communication with each other. The terminal software application can be a proprietary software application or a web browser. In the latter case, the terminal software application is said to include web page programs loaded by the web browser. The web page programs are provided by a server computer 232, and can be coded using, for example, the node.js computer programming language.

Over the Internet 252 or a different wide area network, the terminal devices 202-206 communicate with the real-time communication server 232. The server 232 can be a server farm, a cloud server, or a system of servers. The server 232 accesses a database system 234 (such as a cloud database or a relational-database system) to store and retrieve data. The server 232 includes a processing unit, a networking interface operatively coupled to the process unit, some amount of memory operatively coupled to the processing unit, an operating system (such as Linux operating system) and a special real-time communication server software application executed by the processing unit. The server software application can be written using, for example, the Java or C#, C++ or other programming languages. It manages real-time communication sessions, receives the real-time communication related data from each of the terminal devices 202-206, and empowers diagnosis of the real-time communication between the users 208-212.

During a real-time communication session, the terminal software application running on each terminal device uploads the corresponding user's QoE data of each other participant to the special server software application. In one implementation, the special server software application writes the QoE data into the database 234. The QoE data includes video resolution, choppy video time, video sharpness (also known as video clarity) and choppy audio time. In one implementation, a terminal device's captured video frame rate, video upstream bitrate, video upstream packet loss, video downstream bitrate, video downstream packet loss, received video frame rate, received video frame freeze, received video resolution, audio upstream bitrate, audio downstream bitrate, video freeze time, audio freeze time, video upstream resolution, video downstream resolution, CPU usage, or other relevant data are also uploaded to the special server software application. As used herein, regarding a particular terminal device, upstream indicates data sent out from the terminal device while downstream indicates data received from another terminal device.

The special server software application running on the server 232 presents the QoE data via a novel monitoring and diagnostic system to a user, such as the user 242 operating a monitoring and diagnosing computer system 244. The monitoring and diagnosing computer system 244 includes a processing unit (such as CPU), some amount of memory operatively coupled to the processing unit, a networking interface operatively coupled to the processing unit for accessing the Internet 252, a video interface operatively coupled to the processing unit for displaying representation of real-time communication diagnostic data, an operating system adapted to run on the processing unit, and a special real-time communication diagnostic software application adapted to run on the operating system. The real-time communication diagnostic software application can be a proprietary software application or a web browser. In the latter case, the real-time communication diagnostic software application is said to include web page programs and data loaded by the web browser. The web page programs and data are provided by the server computer 232, and can be coded using, for example, the node.js computer programming language.

Figure 3:
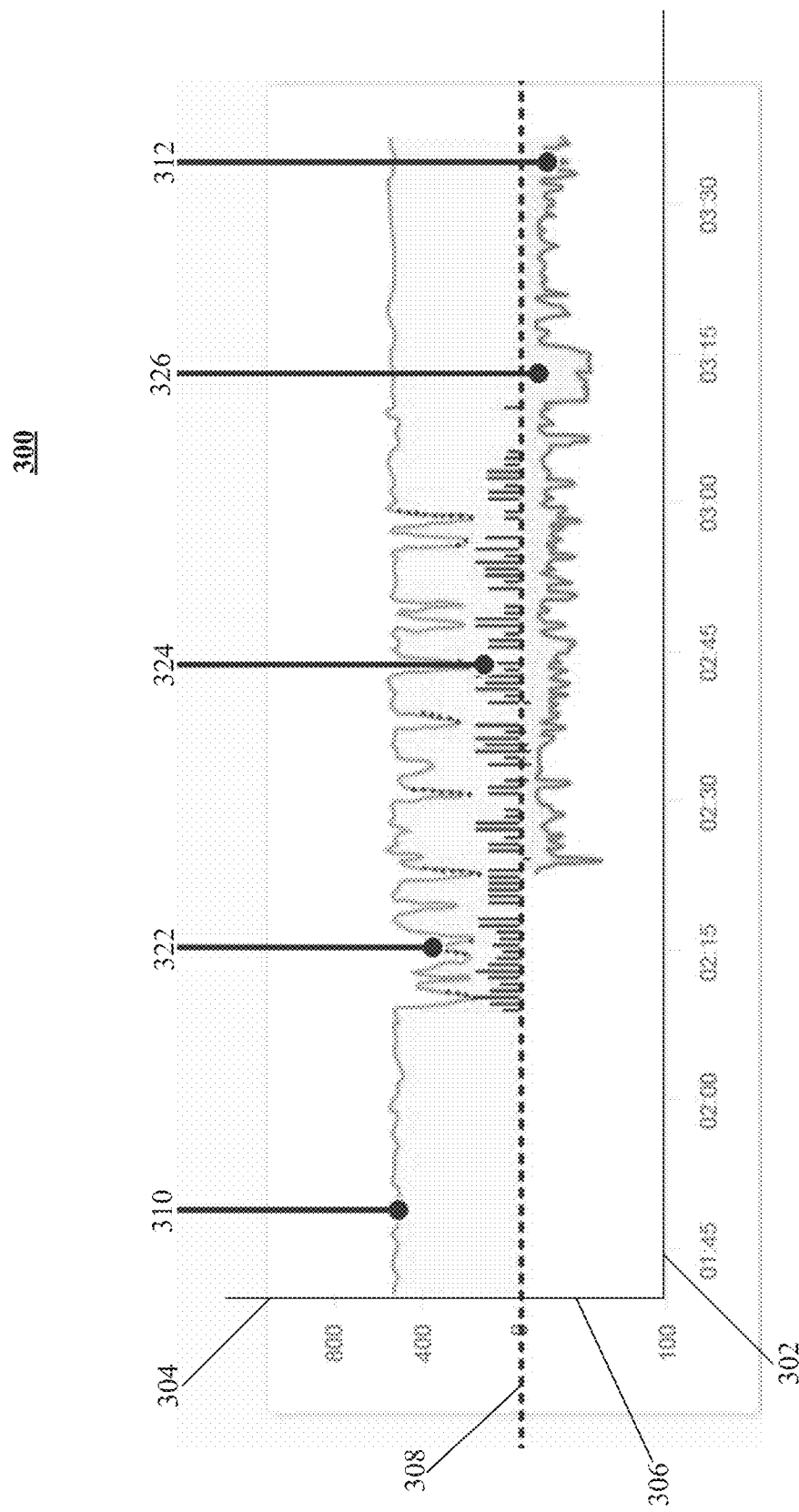
FIG. 3 is a block diagram illustrating a first user's experience of a second user in a real-time communication session in accordance with this disclosure.

The real-time communication diagnostic software application provides a new monitoring and diagnosing system that represents a user's experience of another user on a display screen of a terminal device. Referring to FIG. 3, an illustrative diagram showing a first user's (such as the user 210) experience of a second user (such as the user 212) is shown and generally indicated at 300. The monitoring and diagnosing system 300 is rendered on the display of the terminal device 204 by the special real-time communication diagnostic software application. The diagnosing system 300 includes a time line 302, a video downstream bitrate axis 304 indicating the bit rate of received video data of the user 212 in kilo-bits-per-second (kbps) from the sending terminal device 206, an audio downstream bitrate axis 306 indicating the bit rate of received audio data of the user 212 in kbps from the sending terminal device 206, a video downstream bitrate curve 310, and an audio downstream bitrate curve 312. A reference line 308 separates the axes 304 and 306 with the axis 304 upward and the axis 306 downward. Accordingly, the video downstream bitrate curve 310 is drawn in one color (such as blue) upward above the separator line 308 while the audio downstream bitrate curve 312 is drawn in a different color (such as green) downward below the separator line 308. They are oriented in opposite directions.

When the video received from the terminal device 206 is determined to be blurry, dotted line is drawn in a different color (such as red) on the video downstream bitrate curve 310 at the relevant time segment on the time line 302. An illustrative blurry video indicator is indicated at 322. In the illustrative diagnostic system 300, there are multiple blurry video indicators shown in dotted lines.

When the real-time communication terminal software application running on the terminal device 206 or the server software application detects that the network connection quality is low (such as low through-put) or the bandwidth of the network is low or limited, the terminal software application lowers the rate of video frame rate and/or the resolution of the video frames that it sends out to the terminal device 204. In other words, the terminal software application lowers its video upstream bitrate. In such a case, the user 210 experience blurry video from the user 212; the diagnostic system 300 then displays the dotted lines indicating blurry video.

Due to various reasons, a user's audio and/or video from another user can become choppy. Choppy video is measured by video freeze time. Out of the received video data, choppy video is said to have occurred when two consecutive video frames are apart for more than a predetermined choppy video time threshold in time. In one implementation, 600 ms (ms standing for millisecond) is configured as the predetermined choppy video time threshold in time. In such a case, the time between the two consecutive choppy video frames is referred to herein as choppy video segment length. During a predetermined cycle (such as six seconds), the sum of all choppy video segment lengths is referred to herein as video freeze time.

Figure 4:
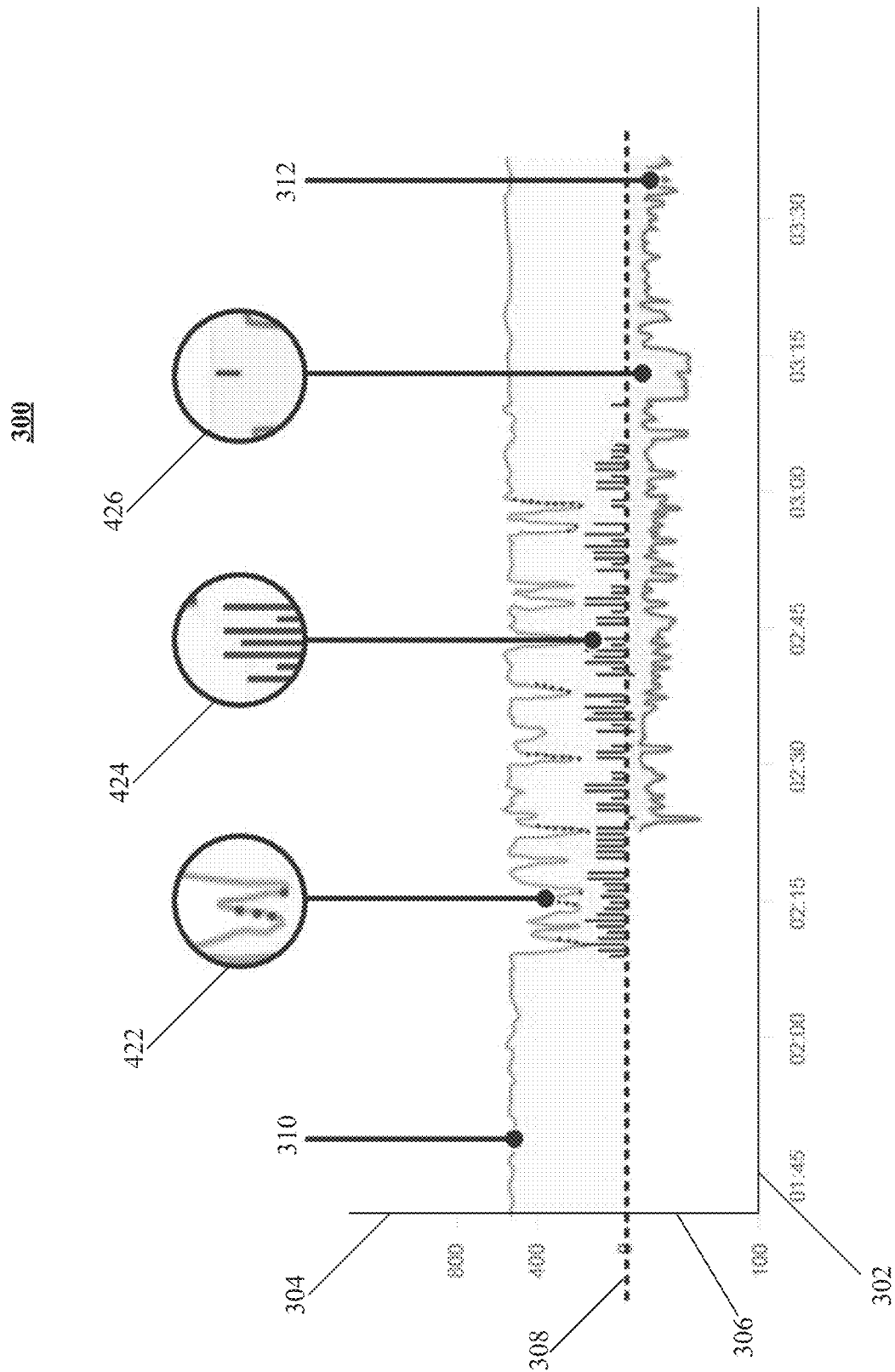
FIG. 4 is a block diagram illustrating a first user's experience of a second user in a real-time communication session in accordance with this disclosure.

When choppy video occurs, a choppy video marker in a color is placed above the separator line 308. A number of choppy video indicators are shown at 324. When choppy audio occurs, a choppy audio marker is placed below the separator line 308. In FIG. 3, a choppy video indicator is shown at 326. The indicators 322, 324 and 326 are further illustrated by reference to FIG. 4. Referring now to FIG. 4, exploded views of the blurry video indicator 322, choppy video indicator 324, and choppy audio indicator 326 are shown and indicated at 422, 424 and 426 respectively.

Figure 5:
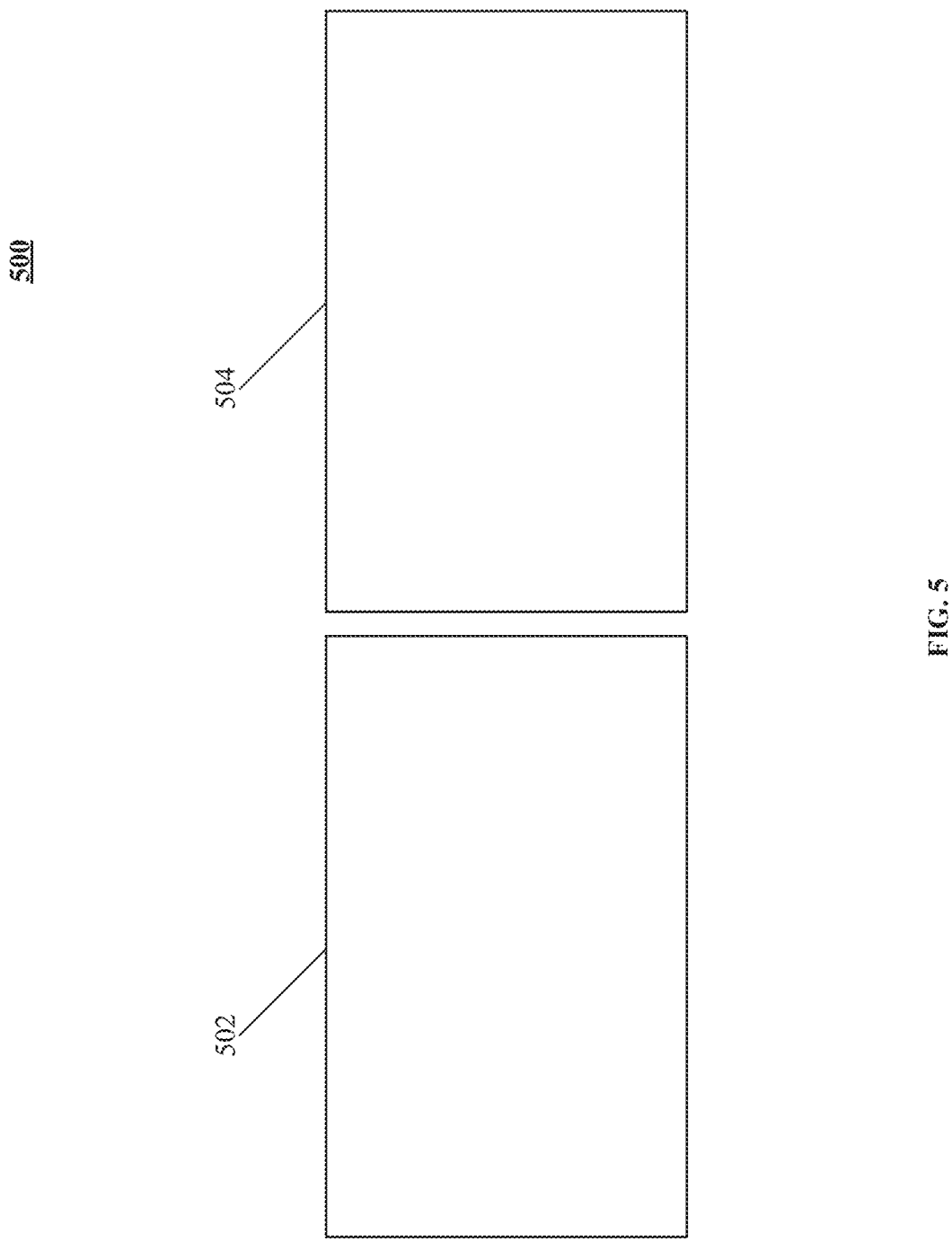
FIG. 5 is a block diagram illustrating a monitoring and diagnostic system with multiple users' experience shown side-by-side in a real-time communication session in accordance with this disclosure.

The monitoring and diagnostic system 300 shows a user's experience of a single other user. In accordance to the present teachings, a user's experience of more than one user can be rendered side-by-side as illustrated in FIG. 5. Turning to FIG. 5, a monitoring and diagnostic system with multiple users' experience shown side-by-side is generally indicated at 500. A first user's experience of a second user is indicated at 502 and the second user's experience of the first user is indicated at 504. For instance, the user's 208 experience of the user 210 is rendered at 502 while the user's 210 experience of the user 208 is indicated at 504. The monitoring and diagnostic systems 502-504 are further illustrated by reference to FIGS. 6 and 7 respectively.

Figure 6:
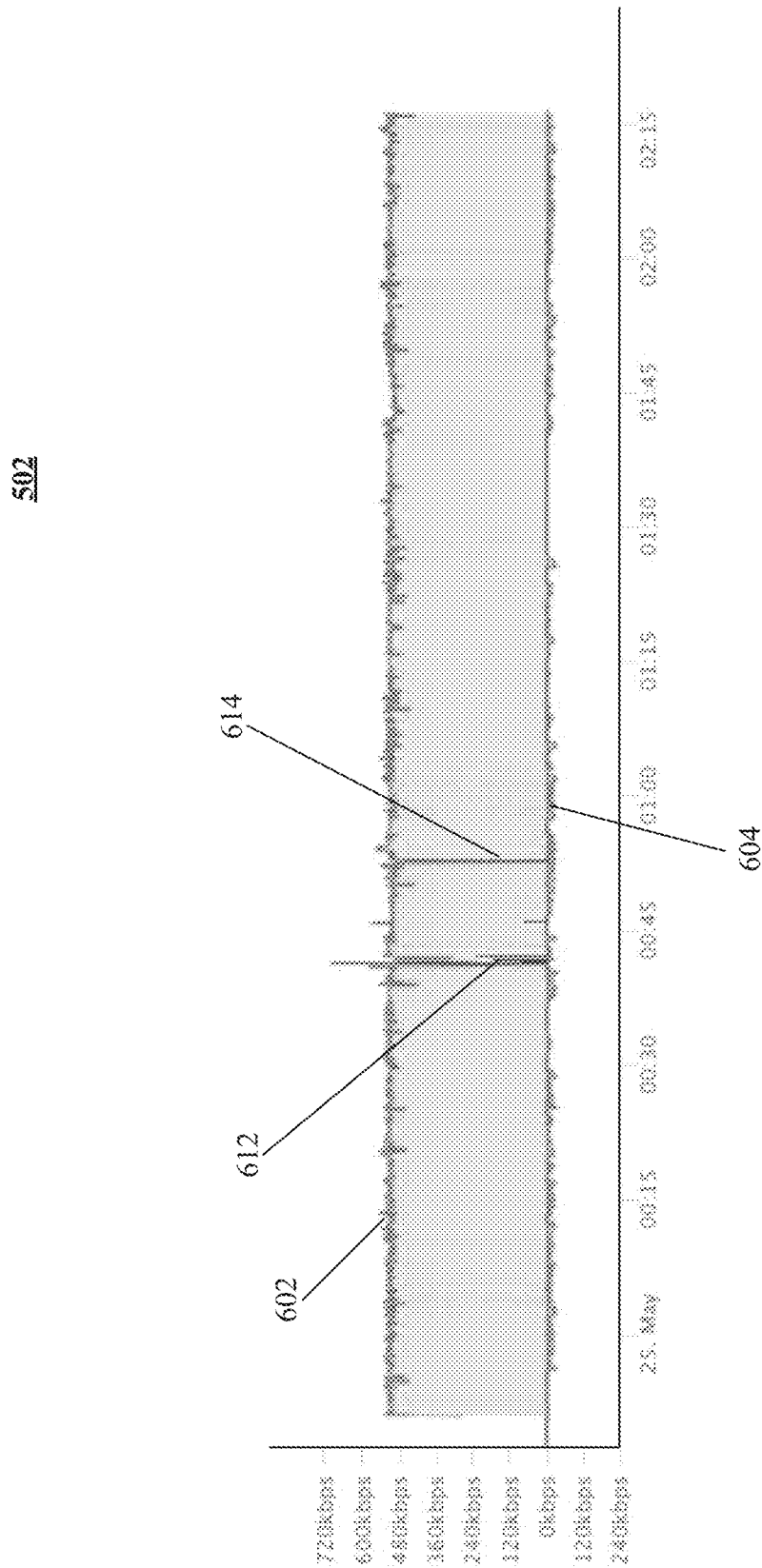
FIG. 6 is a block diagram illustrating a monitoring and diagnostic system showing a participant's video downstream bitrate and audio downstream bitrate from another user in a real-time communication session in accordance with this disclosure.
Figure 7:
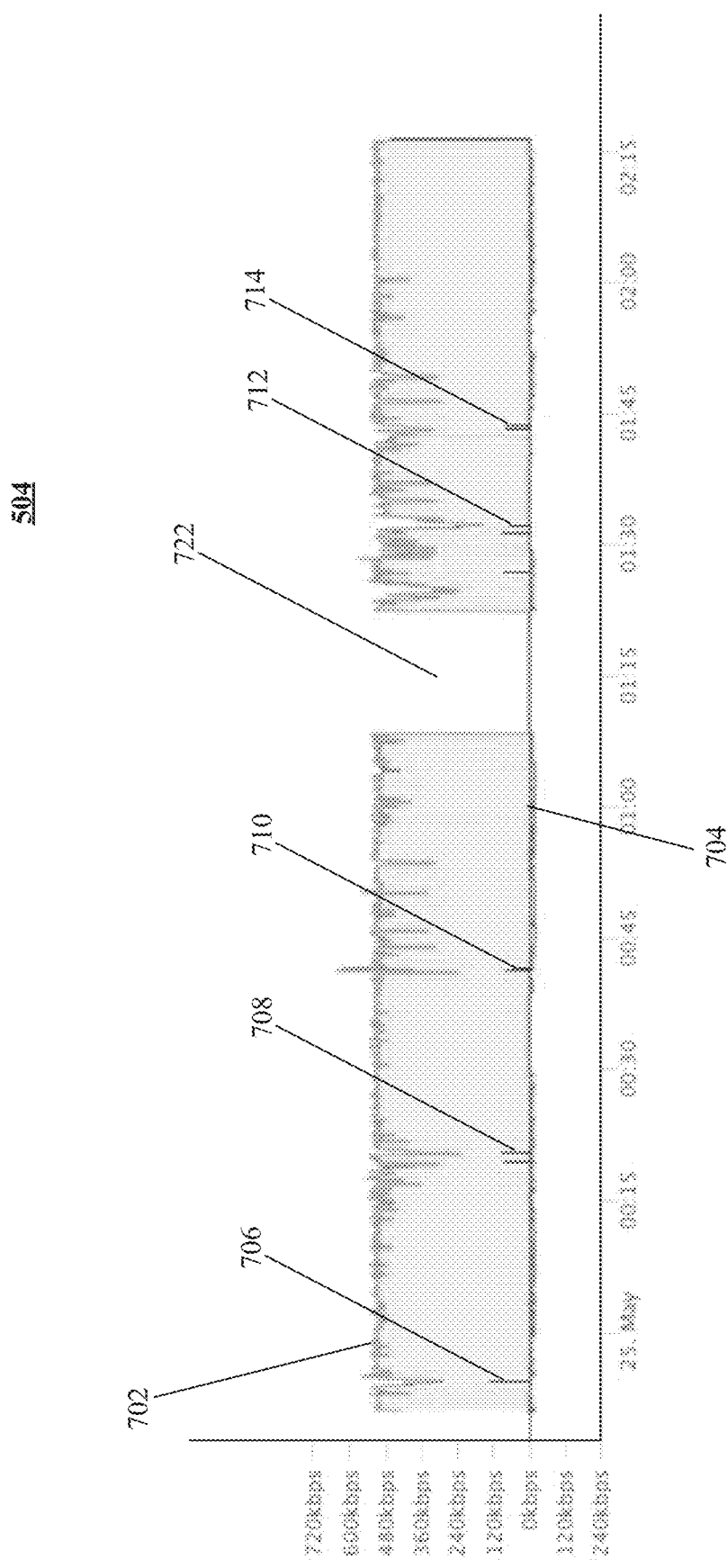
FIG. 7 is a block diagram illustrating a monitoring and diagnostic system showing a participant's video downstream bitrate and audio downstream bitrate from another user in a real-time communication session in accordance with this disclosure.

Turning now to FIGS. 6-7, the terminal device's 202 downstream video from the terminal device 204 is indicated by the bitrate curve 602 while the corresponding downstream audio bitrate curve is indicated at 604. Two occurrences of serious choppy video are indicated at 612 and 614. The height of a choppy video indicator indicates the seriousness of the choppiness of the choppy video. For example, when the video freeze time is long, the choppy video indicating bar is drawn longer than otherwise.

The terminal device's 204 downstream video from the terminal device 202 is indicated by the bitrate curve 702 while the corresponding downstream audio bitrate curve is indicated at 704. Multiple occurrences of less serious choppy video are indicated at 706, 708, 710, 712 and 714. For a short time period, no video data is received or the video is turned off by the user. This scenario is indicated at 722.

Figure 8:
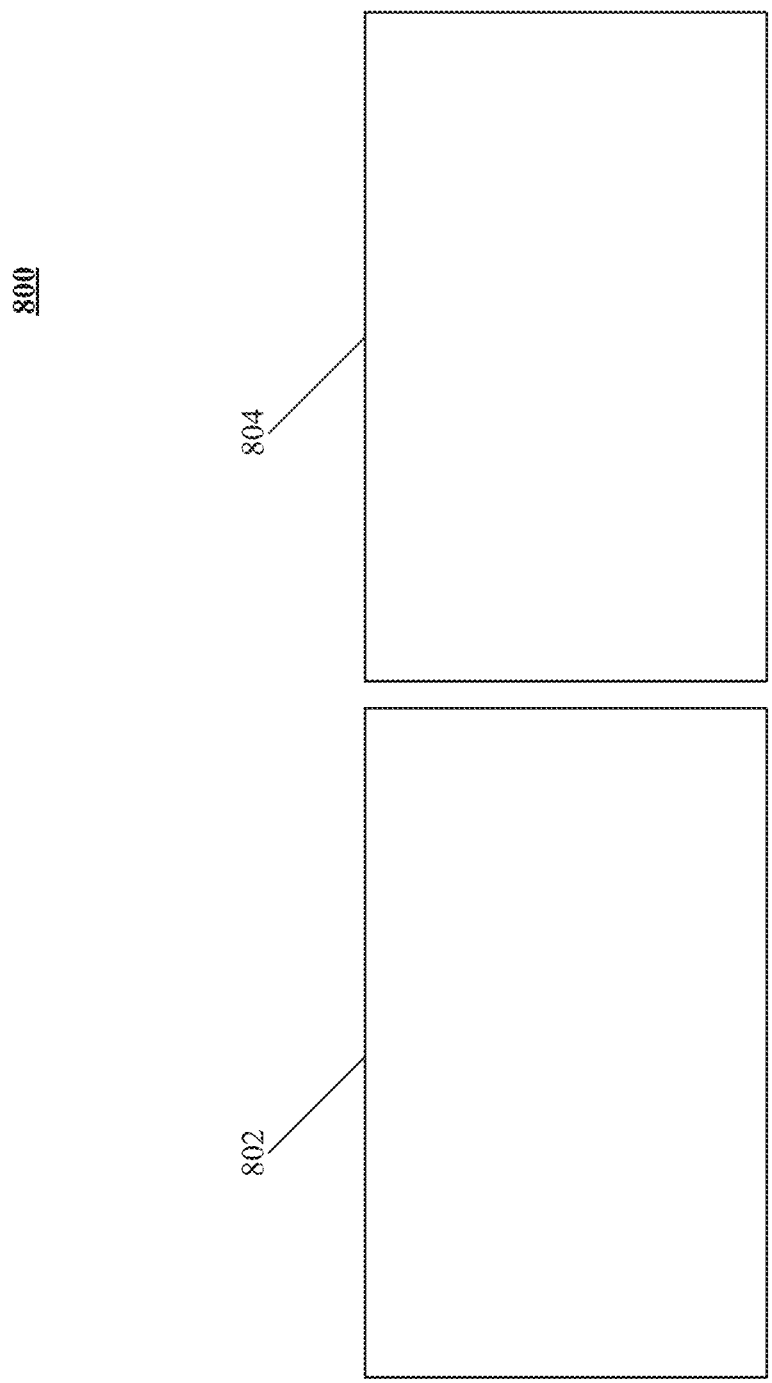
FIG. 8 is a block diagram illustrating a monitoring and diagnostic system with a user's upstream data and a receiving user's downstream data shown side-by-side in a real-time communication session in accordance with this disclosure.
Figure 9:
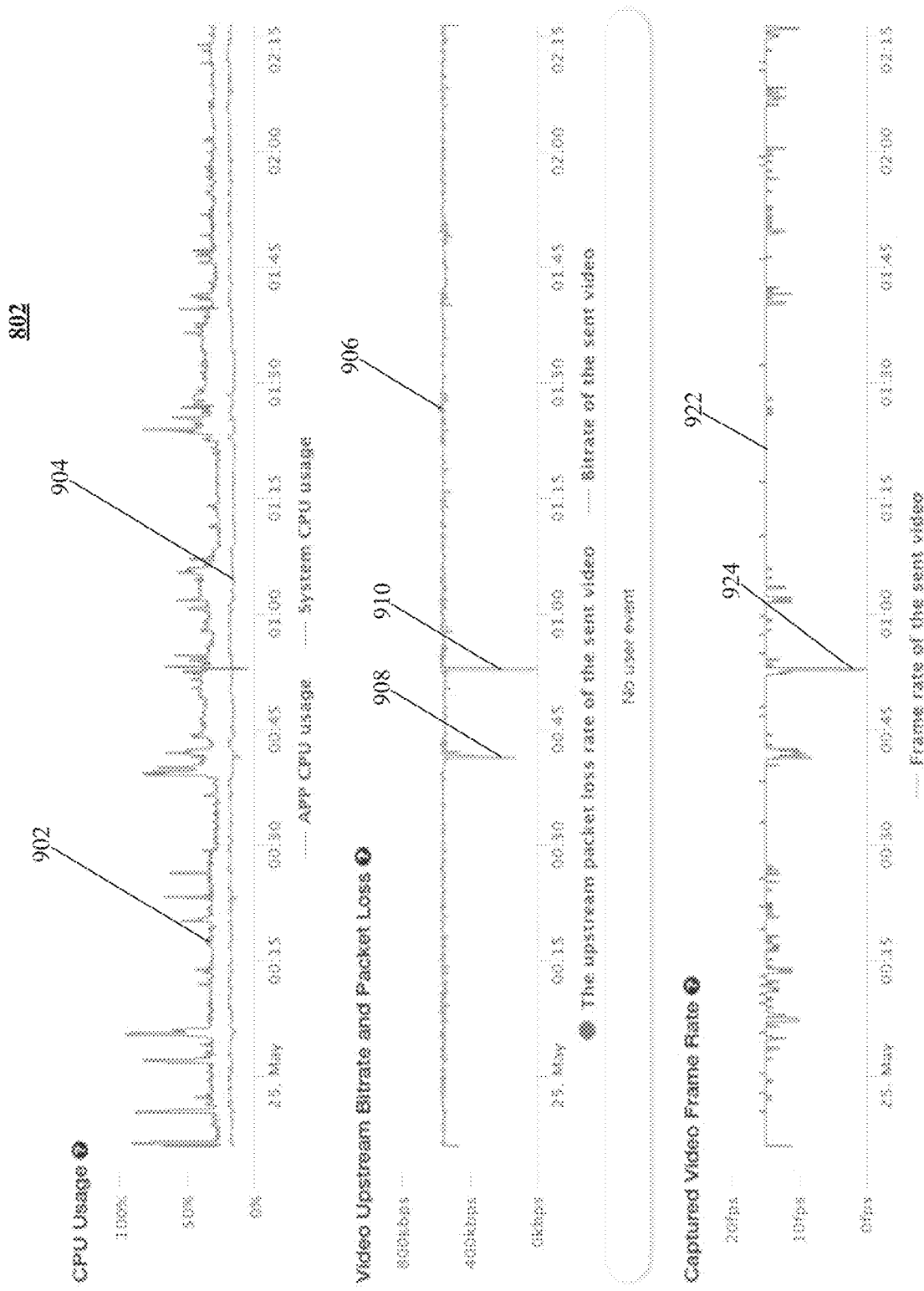
FIG. 9 is a block diagram illustrating a monitoring and diagnostic system showing a participant's upstream data in a real-time communication session in accordance with this disclosure.
Figure 10:
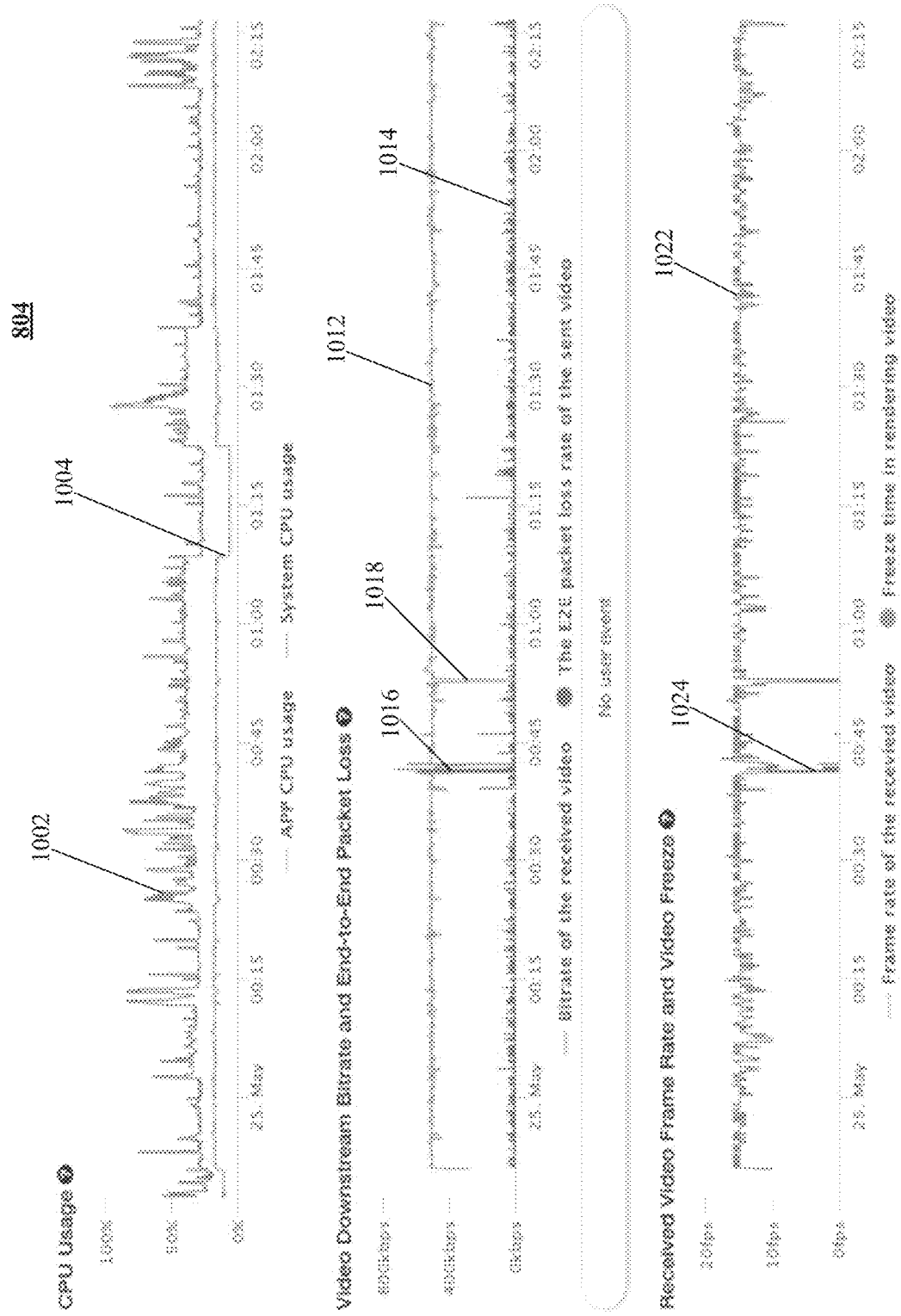
FIG. 10 is a block diagram illustrating a monitoring and diagnostic system showing a participant's downstream data indicating the participant's experience of another user in a real-time communication session in accordance with this disclosure.

In a further implementation, a side-by-side representation of a diagnostic system is shown and generally indicated at 800 in FIG. 8. The user's 208 upstream data to the user 210 is indicated at 802 while the user's 210 experience of the user 208 is indicated at 804. The two diagnostic systems 802 and 804 are further illustrated by reference to FIGS. 9 and 10. Referring now to FIGS. 9 and 10, the terminal device's 202 overall CPU usage is indicated at 902 while the real-time communication terminal software application's CPU usage is indicated 904. The video upstream bitrate curve is indicated at 906. On two occasions, the video upstream bitrate is lowered and indicated at 908 and 910 respectively. The rate of video capture of the terminal device 202, measured by frames per second (fps), is indicated at 922. Drop in the captured video frame rate corresponds to drop in video upstream bitrate. For instance, one drop in the captured video frame rate is indicated at 924. At the same time, the video upstream bitrate drops 910 occurs.

Turning to FIG. 10, the terminal device's 204 downstream data from the terminal device 202 indicating the user's 210 experience of the user 208 is shown and generally indicated at 804. The overall CPU usage of the terminal device 204 is indicated at 1002 while the real-time communication terminal software application's CPU usage is indicated 1004. The video downstream bitrate is indicated at 1012. When the video upstream bitrate drops 908-910 occurs, choppy video occurs twice on the terminal device 204, which are indicated at 1016 and 1018. The received video frame rate and video freeze are indicated at 1022. Corresponding to the choppy video 1016, drop in the received video frame rate occurs and is indicated at 1024.

Figure 11:
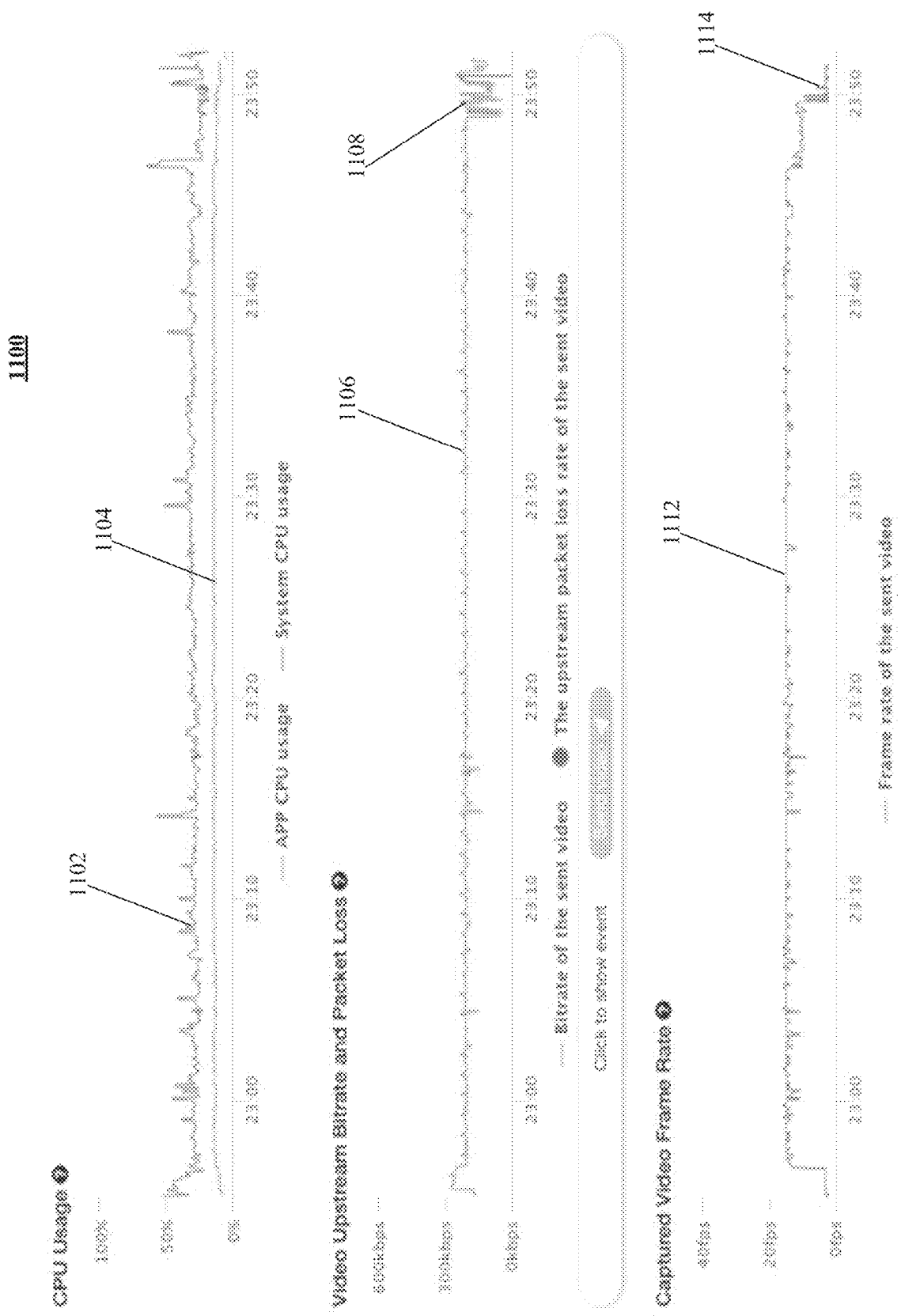
FIG. 11 is a block diagram illustrating a monitoring and diagnostic system showing a participant's upstream data in a real-time communication session in accordance with this disclosure.
Figure 12:
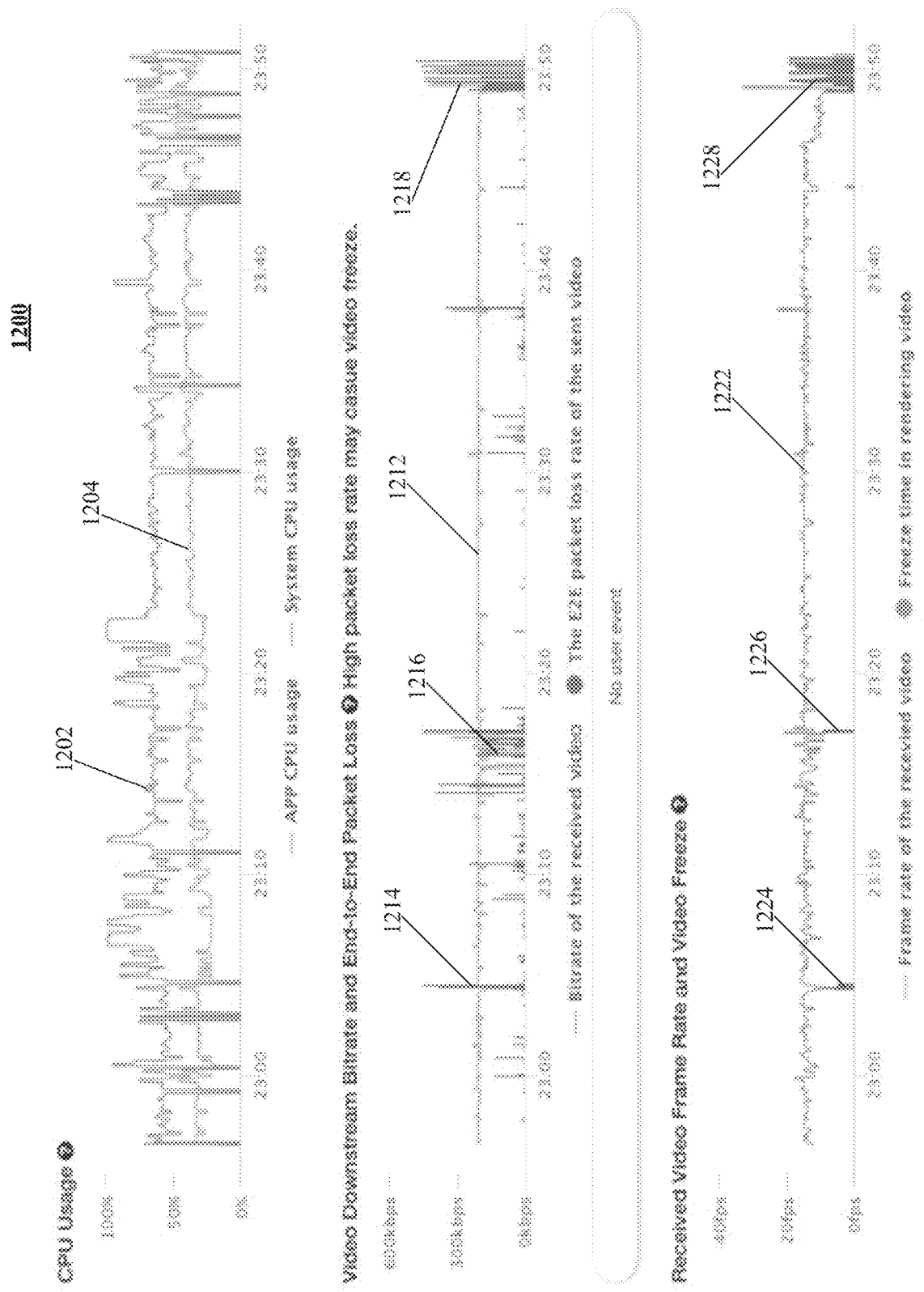
FIG. 12 is a block diagram illustrating a monitoring and diagnostic system showing a participant's downstream data indicating the participant's experience of another user in a real-time communication session in accordance with this disclosure.

Alternate illustrative diagnostic systems 802 and 804 are shown in FIGS. 11 and 12 and generally indicated at 1100 and 1200 respectively. Turning first to FIG. 11, the overall CPU usage of the terminal device 202 is indicated at 1102 while the real-time communication terminal software application's CPU usage is indicated 1104. The video upstream bitrate is indicated at 1106. The video upstream bitrate curve 1106 indicates that the video upstream is normal except a drop 1108 at the end of the time segment. The captured video frame rate is indicated at 1112. Corresponding to the video upstream bitrate drop 1108, the drop in the captured video frame rate is indicated at 1114.

Referring now to FIG. 12, the overall CPU usage of the terminal device 204 is indicated at 1202 while the real-time communication terminal software application's CPU usage is indicated 1204. The video downstream bitrate is indicated at 1212. Two significant drops in video downstream bitrate are indicated at 1214 and 1216. The drops 1214-1216 indicate significant data packet (such as UDP packet) losses. The received video frame rate and video freeze are indicated at 1222. Corresponding to the packet losses 1214-1216, there are two significant drops in received video frame rate that are indicated at 1224 and 1226 respectively. The drops 1214-1216 and 1224-1226 are manifested in choppy video to the user 210. When the drops 1214-1216 and 1224-1226 occur, the corresponding video upstream bitrate 1106 and the captured video frame rate 1112 are normal. The reason of this situation is due to packet loss on the end of the terminal device 204. When the capture video frame rate drop 1114 occurs, choppy video occurs on the terminal device 204 and is indicated at 1218 and 1228 in red color.

Figure 13:
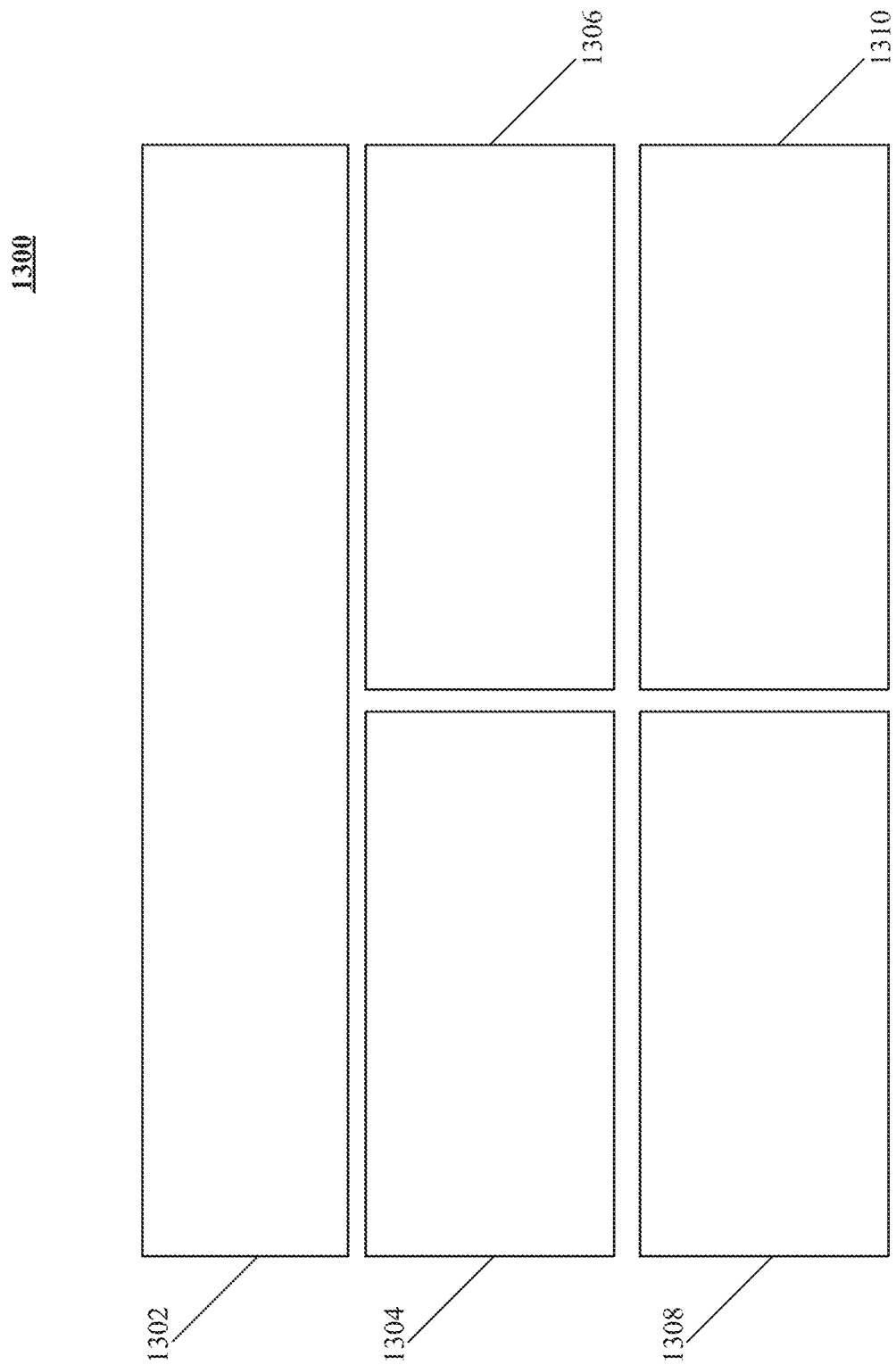
FIG. 13 is a block diagram illustrating a monitoring and diagnostic system showing QoE of four participants in a real-time communication session in accordance with this disclosure.
Figure 14:
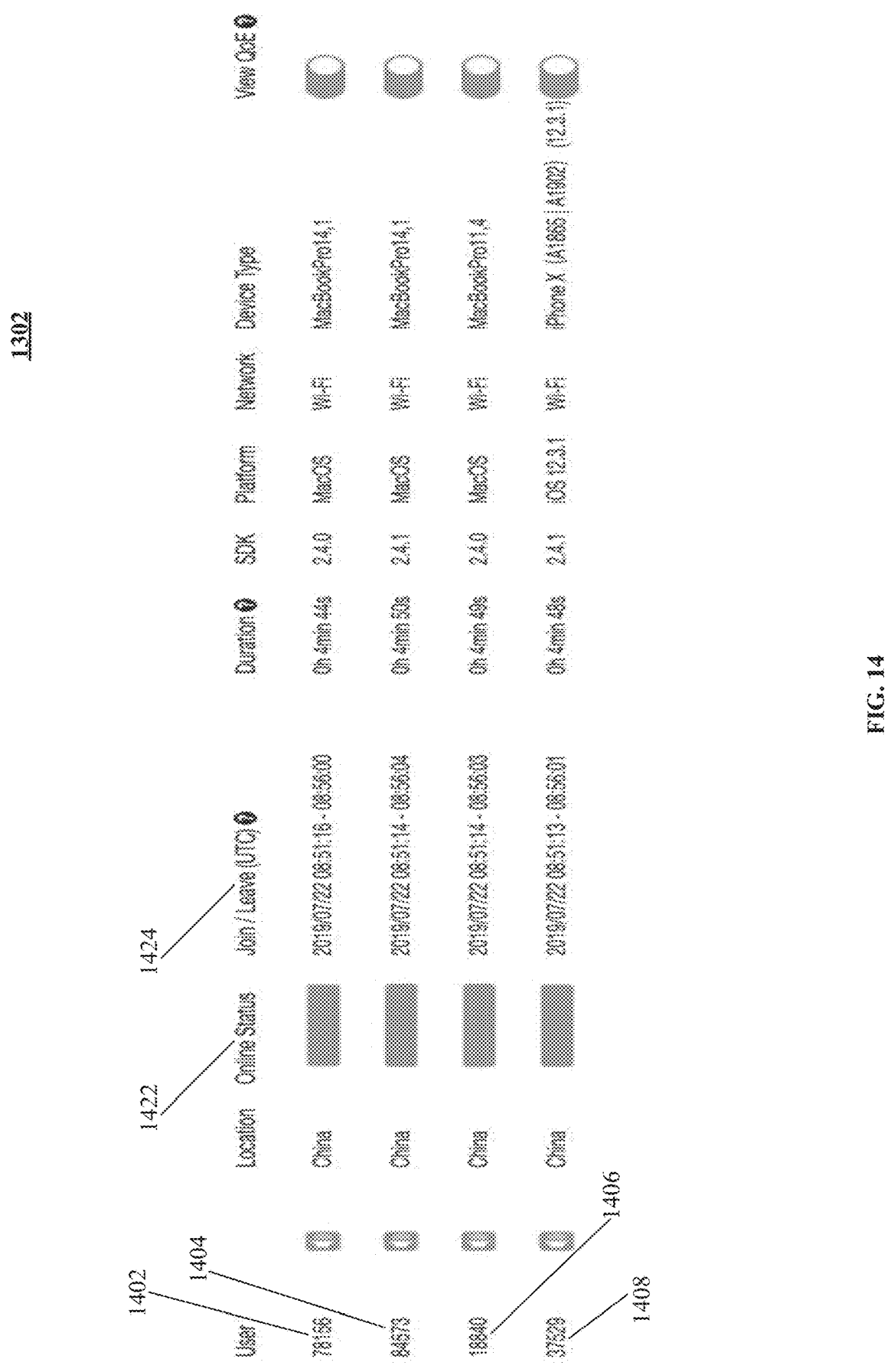

Further in accordance with the present teachings, the new real-time communication QoE diagnostic system allows diagnosis of more than two participants as shown in FIG. 13. Referring now to FIG. 13, an illustrative block diagram showing monitoring data of four participants is shown and generally indicated at 1300. The QoE of the four users are indicated at 1304, 1306, 1308 and 1310 respectively in a single user interface, while the session descriptors are indicated at 1302. The blocks 1302-1310 are further illustrated in FIGS. 14, 15 and 16. Turning first to FIG. 14, in the session block 1302, the four participants are indicated at 1402, 1404, 1406 and 1408 respectively; the online status column (indicating the joining time and leaving time of the participants) of the participants is indicated at 1422, the joining time and leaving time of each participant in the communication session is indicated at 1424. For the monitored time period, all the four users 1402-1408 participate substantially the entire session.

In the illustrative embodiment, the user experience of the participants 1402-1408 are illustrated in the session blocks 1304, 1306, 1308 and 1310 respectively. At any point in time, each user has experience of every other active participant of the session. Referring to FIG. 15, the video reception bitrates of the participant's 1402 experience of other participants are indicated at 1502, 1504 and 1506. The audio reception bitrates of the participant's 1402 experience of another participant is indicated at 1512. For sake of simplicity in the illustration, the audio reception bitrates of the participant's 1402 experience of only one other participant is shown and indicated at 1512. In a commercial system embodying the present teachings, the audio reception bitrates of the participant's 1402 experience of all other participants are shown in different colors, such as the video reception bitrates of the participant's 1402 of all other participants.

The video reception bitrates of the participant's 1406 experience of other participants are indicated at 1522, 1524 and 1526. The audio reception bitrates of the participant's 1406 experience of other participants are indicated at 1532. The participant's 1406 video reception from two other participants is lost for a short time period 1536, while the audio is on and the video reception from the other participant is choppy during this period. The video interruption is indicated at 1506. The video interruption 1506 could be, for example, the case that the participant turns off video and listens to audio only.

Figure 16:
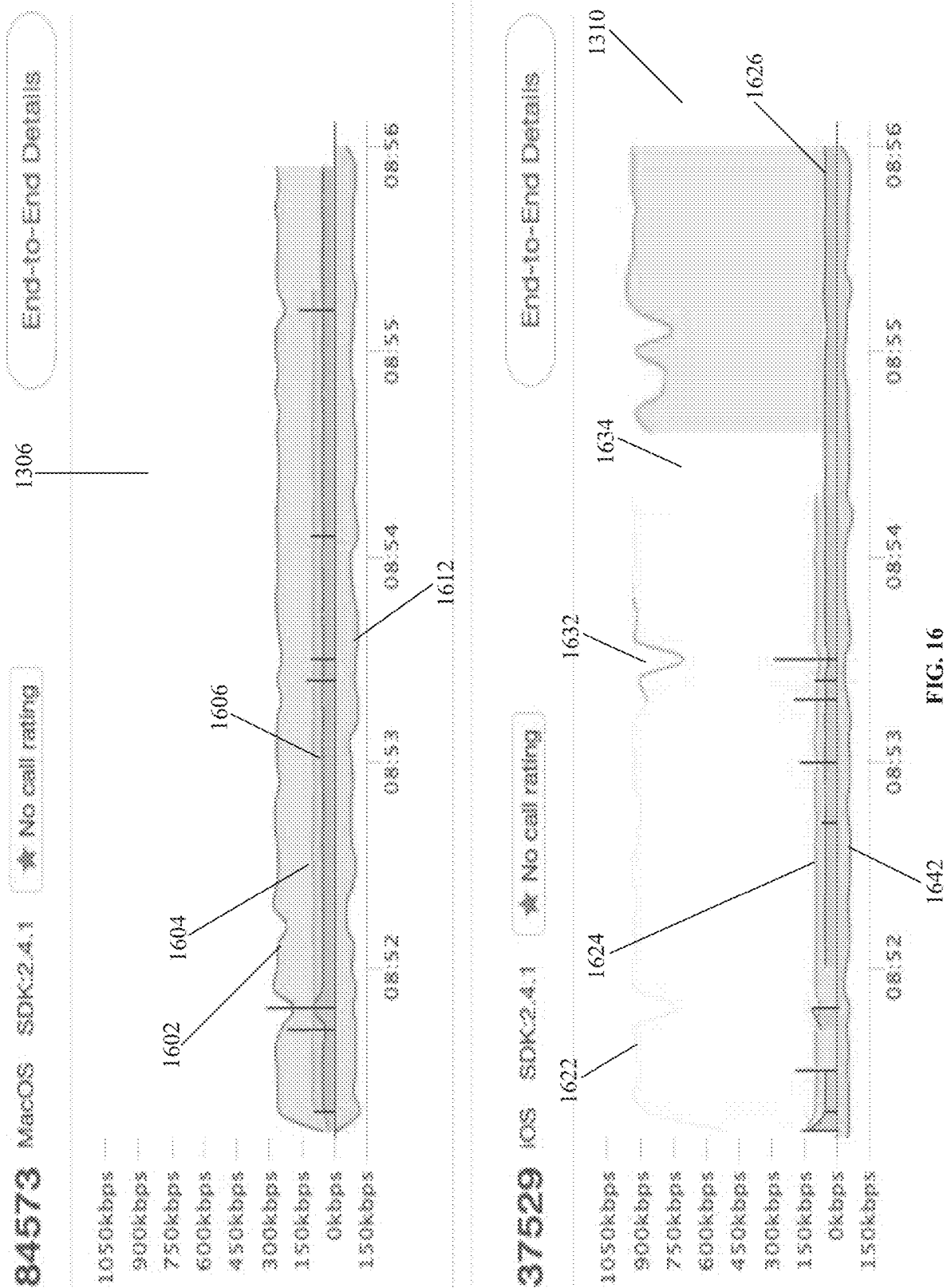
FIG. 16 is a block diagram illustrating a monitoring and diagnostic system showing multiple participants' experience in a real-time communication session in accordance with this disclosure.

Referring to FIG. 16, the video reception bitrates of the participant's 1404 experience of other participants are indicated at 1602, 1604 and 1606. The audio reception bitrates of the participant's 1404 experience of other participants are indicated at 1612. The video reception bitrates of the participant's 1408 experience of other participants are indicated at 1622, 1624 and 1626, while the audio reception bitrate is indicated at 1642. A choppy video experience of one other participant occurs at 1632. The broken video reception from two other participants is indicated at 1634.

Obviously, many additional modifications and variations of the present disclosure are possible in light of the above teachings. Thus, it is to be understood that, within the scope of the appended claims, the disclosure may be practiced otherwise than is specifically described above. For example, the bitrate curves 1602-1606 and 1612 can be rendered in different colors. As an additional example, the blurry video indicator 322, the choppy video bars 324, and the choppy audio bar 326 can be rendered in different color or pattern.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A real-time communication monitoring and diagnosing computer system comprising:
   1) a processing unit;
   2) some amount of memory operatively coupled to said processing unit;
   3) a networking interface operatively coupled to said processing unit for accessing the Internet;
   4) a video interface operatively coupled to said processing unit for displaying representation of real-time communication diagnostic data;
   5) an operating system adapted to run on said processing unit;
   6) a special real-time communication diagnostic software application adapted to run on the operating system and communicate with a special real-time communication server software application over the Internet, said special real-time communication diagnostic software application adapted to display a real-time communication monitoring and diagnosing system on said video interface, wherein said real-time communication monitoring and diagnosing system includes:
      a) a time line indicate time of a real-time communication session;

b) a video downstream bitrate axis extending upward from a reference line;
c) an audio downstream bitrate axis extending downward from said reference line;
d) a video downstream bitrate curve in a first color above said reference line;
e) an audio downstream bitrate curve below said reference line in a second color, and
f) a set of choppy video indicators in a third color extending upward from and along said reference line.

2. The real-time communication monitoring and diagnosing computer system of claim 1 wherein said real-time communication monitoring and diagnosing system further includes a set of blurry video indicators in a fourth color along said video downstream bitrate curve, wherein said fourth color is different from said first color.

3. The real-time communication monitoring and diagnosing computer system of claim 1 wherein each blurry video indicator within said set of blurry video indicators is rendered as a dotted line.

4. The real-time communication monitoring and diagnosing computer system of claim 3 wherein said third color and said fourth color are red.

5. The real-time communication monitoring and diagnosing computer system of claim 1 wherein said real-time communication monitoring and diagnosing system further includes a set of choppy audio indicators in a fourth color extending downward from and along said reference line.

6. The real-time communication monitoring and diagnosing computer system of claim 5 wherein said third color and said fourth color are red.

7. The real-time communication monitoring and diagnosing computer system of claim 6 wherein said real-time communication monitoring and diagnosing system further includes a set of blurry video indicators in a fifth color along said video downstream bitrate curve, wherein said fifth color is different from said first color.

8. The real-time communication monitoring and diagnosing computer system of claim 7 wherein said fifth color is red.

9. A real-time communication monitoring and diagnosing computer system comprising:
1) a processing unit;
2) some amount of memory operatively coupled to said processing unit;
3) a networking interface operatively coupled to said processing unit for accessing the Internet;
4) a video interface operatively coupled to said processing unit for displaying representation of real-time communication diagnostic data;
5) an operating system adapted to run on said processing unit;
6) a special real-time communication diagnostic software application adapted to run on the operating system and communicate with a special real-time communication server software application over the Internet, said special real-time communication diagnostic software application adapted to display a left real-time communication monitoring and diagnosing system and a right real-time communication monitoring and diagnosing system on said video interface, wherein said left monitoring and diagnosing system and said right monitoring and diagnosing system are displayed side-by-side, and wherein:

a. said left monitoring and diagnosing system includes a first time line indicating time of a real-time communication session;
b. said left monitoring and diagnosing system includes a first video downstream bitrate axis extending upward from a first reference line;
c. said left monitoring and diagnosing system includes a first audio downstream bitrate axis extending downward from said first reference line;
d. said left monitoring and diagnosing system includes a first video downstream bitrate curve in a first color above said first reference line, said first video downstream bitrate curve indicating bitrates of video data received by a first terminal device from a second terminal device;
e. said left monitoring and diagnosing system includes a first audio downstream bitrate curve below said first reference line, said first audio downstream bitrate curve indicating bitrates of audio data received by said first terminal device from said second terminal device;
f. said left monitoring and diagnosing system includes a first set of choppy video indicators in a second color extending upward from and along said first reference line;
g. said right monitoring and diagnosing system includes a second time line indicating time of said real-time communication session;
h. said right monitoring and diagnosing system includes a second video downstream bitrate axis extending upward from a second reference line, said second video downstream bitrate curve indicating bitrates of video data received by said second terminal device from said first terminal device;
i. said right monitoring and diagnosing system includes a second audio downstream bitrate axis extending downward from said second reference line;
j. said right monitoring and diagnosing system includes a second video downstream bitrate curve in a third color above said second reference line;
k. said right monitoring and diagnosing system includes a second audio downstream bitrate curve below said second reference line, said second audio downstream bitrate curve indicating bitrates of audio data received by said second terminal device from said first terminal device; and
l. said right monitoring and diagnosing system includes a second set of choppy video indicators in a second color extending upward from and along said second reference line.

10. The real-time communication monitoring and diagnosing computer system of claim 9 wherein said second color is red and different from said first color and said third color.

11. The real-time communication monitoring and diagnosing computer system of claim 9 wherein said left monitoring and diagnosing system further includes a first set of choppy audio indicators in a fourth color extending downward from and along said first reference line, and said right monitoring and diagnosing system further includes a second set of choppy audio indicators in a fourth color extending downward from and along said second reference line.

12. The real-time communication monitoring and diagnosing computer system of claim 11 wherein said second color is red.

* * * * *